Oct. 20, 1931.  W. J. CLINE ET AL  1,828,026
AIRCRAFT
Filed Sept. 3, 1929   2 Sheets-Sheet 1
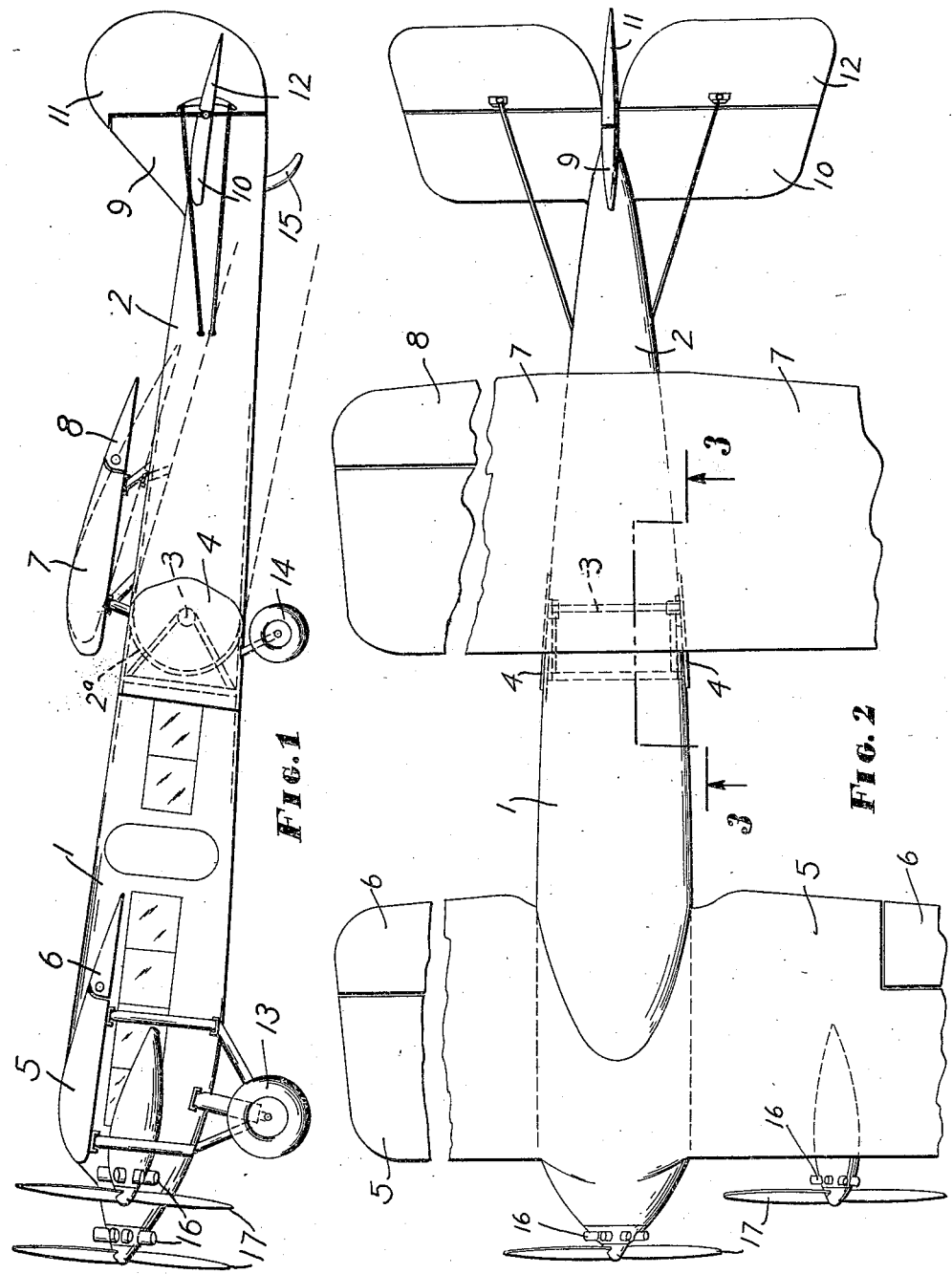
INVENTOR
WALTER J. CLINE
BY MARTIN F. WAGNER
ATTORNEY Oct. 20, 1931.  W. J. CLINE ET AL  1,828,026
AIRCRAFT
Filed Sept. 3, 1929  2 Sheets-Sheet 2
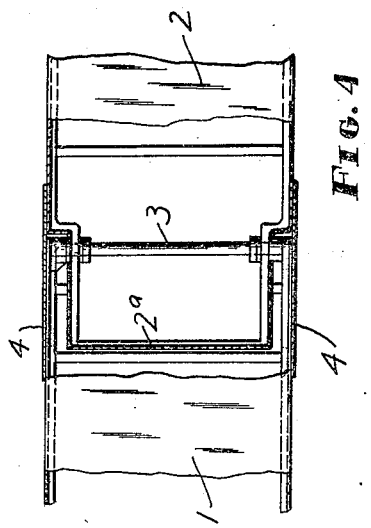
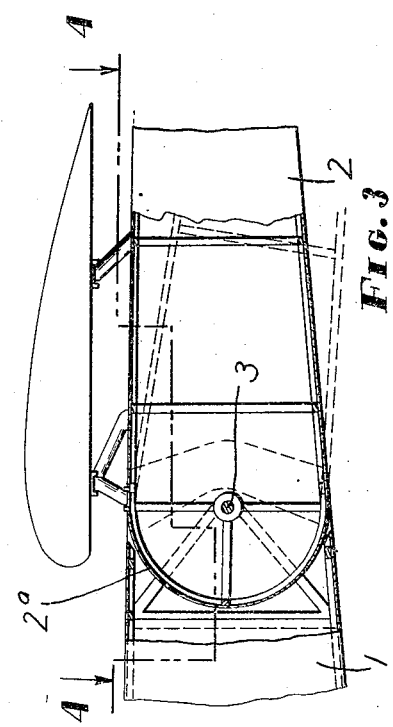
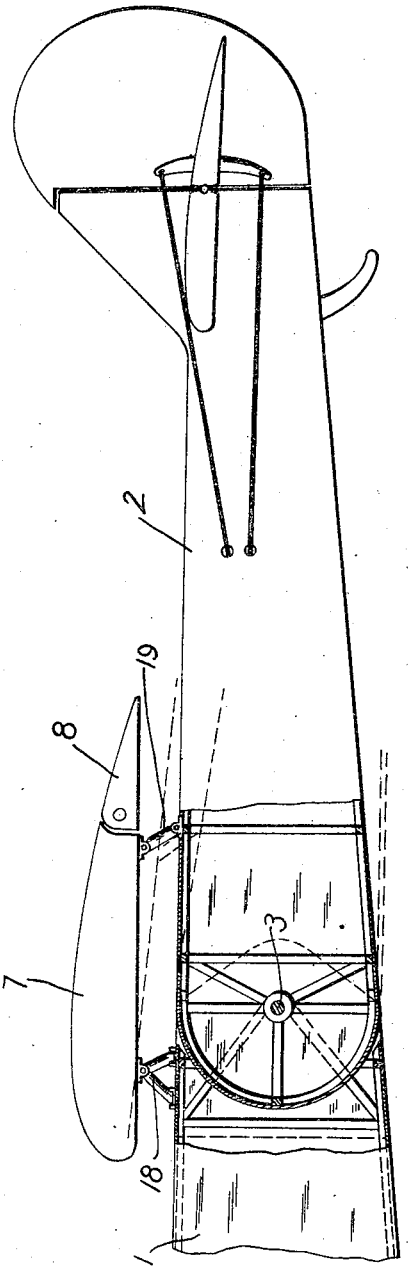
INVENTOR
WALTER J. CLINE
BY MARTIN F. WAGNER
ATTORNEY Patented Oct. 20, 1931

1,828,026

UNITED STATES PATENT OFFICE

WALTER J. CLINE AND MARTIN F. WAGNER, OF SAN DIEGO, CALIFORNIA

AIRCRAFT

Application filed September 3, 1929. Serial No. 390,108.

Our invention relates to aircraft, and more particularly to airplanes, and the objects of our invention are: First, to provide an aircraft having greater inherent longitudinal stability than aircraft heretofore constructed; second, to provide an aircraft having greater facility for elevational control, and one in which the craft will respond readily and easily to such control; third, to provide an aircraft of this class having greater lift and load capacity; fourth, to provide an aircraft of this class in which the dead and live loads need not be distributed with respect to the lift of the wings, that is, in which the load distribution is not subject to balance; fifth, to provide a fuselage for airplanes which is flexible intermediate its ends so that, when a long fuselage is employed, the same will not be subjected to the extreme strains, either when in flight or when landing, as in the case of the rigid fuselage; sixth, to provide a fuselage for airplanes in which the fuselage is made of front and rear sections pivotally connected together, and in which the front section is efficiently streamlined with the rear section; seventh, to provide an aircraft of this class with a long body having flexibly connected front and rear sections and in which the whole is controlled elevationally and directionally by controls at the rear end of the body; eighth, to provide as a whole a novelly constructed aircraft of this class, and ninth, to provide such an aircraft which is simple and economical of construction, durable, easy to control and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side view of an airplane incorporating our invention, showing by dotted lines the rear section of the airplane shifted to a lower inclined position with respect to the front section; Fig. 2 is a fragmentary plan view thereof; Fig. 3 is an enlarged partial sectional and partial elevational view thereof showing particularly the pivoted connection between the front and rear sections; Fig. 4 is a fragmentary sectional view thereof taken through 4—4 of Fig. 3, and Fig. 5 is a fragmentary partial sectional and partial side elevational view of a slightly modified form of construction of our invention.

Like characters of reference refer to similar parts and portions throughout the several views of the drawings.

The embodiment of our invention, as illustrated in the drawings, is in a monoplane type airplane, but it will be understood that our invention may be embodied in other types of airplanes or other aircraft.

The body of the airplane or aircraft illustrated is a long fuselage consisting of a front fuselage member or section 1 and a rear fuselage member or section 2. The forward end of the rear fuselage member or section 2 is pivotally connected to the rear end of the front fuselage member or section 1 on a horizontal axis by means of a pivot pin 3 or other suitable pivot means. The pivotal axis extends transversely with respect to the longitudinal axis of the fuselage sections so that the rear section may move angularly, upwardly or downwardly with respect to the front section. As shown in the drawings, the forward end of the rear section is positioned intermediate the side walls at the rear end of the front section. The forward end of the rear section is preferably constructed on a circular arc, designated 2a in Fig. 3, the curvature being substantially concentric with the pivotal axis. This curved portion at the front end of the rear section extends into the rear end of the front section and is positioned between the upper and lower walls thereof, as shown best in Fig. 3. Such construction permits a relatively close joint between two sections and permits the air to flow freely past the joints between the two sections. At the lateral sides of the front section 1 may be secured plates 4 for covering the joint between the two sections and for streamlining the sides of the fuselage between the front and rear sections, as shown in Figs. 1 and 4.

The front fuselage member or section 1 is supported independently from the rear section by a wing 5 in the form of a wing of a monoplane. This wing is provided with ailerons 6 at its trailing edge as in conventional airplane construction.

The rear fuselage member or section 2 is also independently supported at its forward end by a wing 7, also in the form of a wing of a monoplane. The wing 7 is preferably positioned slightly above the fuselage section 2, as shown, so that the same will not interfere with the upward and downward shifting of the rear fuselage section. The rear wing 7 is also preferably provided with ailerons 8 which are preferably controlled simultaneously with the ailerons 6 (the control not being shown).

The front fuselage section is not provided with stabilizers or controls, but such stabilizers and controls are provided at the rear end of the rear section only. These stabilizers and controls, consisting of the vertical stabilizer 9, the horizontal stabilizers 10, the rudder 11 connected to the rear edge of the vertical stabilizer 9, and the elevators 12 connected to the rear edges of the horizontal stabilizers 10, are substantially the same as in conventional airplane construction. The rudder and elevators are controlled from the forward end of the front fuselage section (the control not being shown). The forward end of the front section of the aircraft is supported by the usual undercarriage 13 which may be a landing gear for land planes, as shown, or pontoons for hydroplanes. The rear end of the forward section, when adapting the aircraft for alighting on land, is provided with a tail skid 14 in the form of a carriage or wheel. At the rear end of the rear section may be provided the usual tail skid 15, as shown.

The airplane may be propelled by motors 16 and propellers 17 mounted in the nose of the front fuselage section and in front of the front wing at either side of the fuselage, the motors mounted at the sides of the fuselage being supported in any suitable manner from the wings or the front section of the fuselage.

In the modified structure shown in Fig. 5, the rear wing 7 is mounted on both the rear end of the front section of the fuselage and on the forward portion of the rear section. The wing 7 in this modified form of construction is pivotally mounted at the underside and near the entering edge, preferably at the front spar, on struts 18 extending upwardly from the rear end of the front section. The rear portion of the wing is pivotally mounted, preferably at the rear spar of the wing 7, on struts 19 which are pivotally mounted at their lower ends on the upper portion and near the forward end of the rear section, as shown in Fig. 5. However, it will be obvious that these struts 19 may be extended longer and pivoted at the middle or at the lower side of the rear section near the front end. With the construction shown in Fig. 5, the angular shifting of the wing 7 with respect to the rear fuselage section 2 is approximately the same as in the other structure described, but the position thereof with respect to the rear end of the front section 1 and with respect to the pivotal axis of both fuselage sections is substantially fixed. The structure shown in Fig. 5 also connects the two fuselage sections more rigidly.

In both structures, it will be noted, that the center of lift of the rear wing is substantially in line with the pivotal axis of the two sections so that the angle of the following or rear wing may be readily varied by the controls at the tail of the rear section of the fuselage.

Though we have shown and described a particular construction, combination and arrangement of parts and portions, and a certain embodiment of our invention, and a certain modification thereof, we do not wish to be limited to this particular construction, combination and arrangement, nor to the modification, but desire to include in the scope of our invention of the construction, combination and arrangement substantially as set forth in the appended claims.

Having thus described our invention, what we claim as new and desire to secure by Letters Patent is:

1. In an aircraft of the class described, a long body comprising front and rear sections pivotally connected at their adjacent ends on a horizontal axis extending transversely to the body, horizontal supporting wings positioned at and connected to the forward ends of the front and rear sections.

2. In an aircraft of the class described, a long aircraft body comprising front and rear sections pivotally connected together at their adjacent ends on a horizontal axis extending transversely with respect to the body, a horizontal airfoil positioned at the pivotal connection of the two sections and pivotally connected to the adjacent end portions of each, and control surfaces on the rear section.

3. In an aircraft of the class described, a fuselage member having a supporting wing at its forward end, a second fuselage member pivotally connected at its forward end to the rear end of the first fuselage member, said second fuselage member also having a supporting wing, the normal center of lift thereof being substantially in line with the pivotal axis of said second fuselage, and means for controlling the alinement and angular shifting of the fuselage members with respect to each other.

4. In an aircraft of the class described, a fuselage member having a supporting wing at its forward end, a second fuselage member pivotally connected at its forward end to the rear end of the first fuselage member, said second fuselage member also having a supporting wing, the normal center of lift thereof being substantially in line with the pivotal axis of said second fuselage, and control surfaces at the rear end of the second fuselage member for controlling the aircraft.

5. In an aircraft of the class described, a fuselage member having a supporting wing at its forward end, a second fuselage member pivotally connected at its forward end to the rear end of the first fuselage member, said second fuselage member also having a supporting wing, said latter wing being pivotable relative to said first fuselage member, and means for controlling the aircraft.

6. In an aircraft of the class described, a fuselage member having a supporting wing at its forward end, a second fuselage member pivotally connected at its forward end to the rear end of the first fuselage member, said second fuselage member also having a supporting wing, and means for controlling the aircraft, the supporting wing at the forward end of the second fuselage member being pivotally connected at its forward portion to the rear end of the first fuselage member and at its rear portion to the second fuselage member.

7. In an aircraft of the class described, a fuselage member having a supporting wing at its forward end, a second fuselage member pivotally connected at its forward end to the rear end of the first fuselage member, said second fuselage member also having a supporting wing, means for pivoting said latter wing relative to said first fuselage member, means for controlling the aircraft, and means streamlining said fuselage members with each other at their pivotal connection.

8. In an aircraft of the class described, a long fuselage flexible intermediate its ends, a supporting wing at the forward end of the fuselage, a second supporting wing at the flexible portion of the fuselage, said latter wing adapted to assume an angle relative to said first wing on flexure of said fuselage, and control surfaces at the rear end of the fuselage.

9. In an aircraft of the class described, a long fuselage flexible intermediate its ends, a supporting wing at the forward end of the fuselage, a second wing at the flexible portion of the fuselage, control surfaces at the rear end of the fuselage and propelling means at the forward portion of the fuselage and the forward supporting wing.

10. In an aircraft of the class described, a long fuselage comprising a forward section and a rear section pivotally connected at their adjacent ends and substantially alined, supporting means at the forward end of the front section and at the pivotal portion of both sections and at the rear end of the rear section, a supporting wing at the forward portion of the front section, a second supporting wing at the front portion of the rear section, and controlling surfaces at the rear end of the rear section.

11. In an aircraft of the class described, a long fuselage comprising a forward section and a rear section pivotally connected at their adjacent ends and substantially alined, supporting means at the forward end of the front section and at the pivotal portion of both sections and at the rear end of the rear section, an airfoil at the forward portion of the front section, and an airfoil at the forward portion of the rear section.

12. In an aircraft of the class described, a long fuselage comprising a forward section and a rear section pivotally connected at their adjacent ends and substantially alined, supporting means at the forward end of the front section and at the pivotal portion of both sections and at the rear end of the rear section, an airfoil at the forward portion of the front section, and an airfoil at the forward portion of the rear section, said airfoil being pivotally connected to the rear end of the front section and to the forward portion of the rear section.

In testimony whereof, we have hereunto set our hands at San Diego, California, this 29th day of August, 1929.

WALTER J. CLINE.
MARTIN F. WAGNER.